United States Patent
Tian et al.

(10) Patent No.: US 7,650,083 B2
(45) Date of Patent: Jan. 19, 2010

(54) DEMODULATING A SIGNAL BY PERFORMING CONSECUTIVE BEAM SPLITTING

(75) Inventors: Cechan Tian, Plano, TX (US); Takao Naito, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 476 days.

(21) Appl. No.: 11/479,836

(22) Filed: Jun. 30, 2006

(65) Prior Publication Data

US 2008/0002980 A1 Jan. 3, 2008

(51) Int. Cl.
*H04B 10/06* (2006.01)

(52) U.S. Cl. ............ 398/202; 398/188; 398/183; 398/204; 398/207

(58) Field of Classification Search ........... 398/182, 398/183, 188, 202, 212, 213, 214, 161, 158, 398/204, 207
See application file for complete search history.

(56) References Cited

U.S. PATENT DOCUMENTS 6,626,589 B1 * 9/2003 Epworth ............ 398/54
7,343,104 B2 * 3/2008 Doerr et al. ............ 398/212
2006/0056845 A1 * 3/2006 Parsons et al. ............ 398/41

OTHER PUBLICATIONS

Jay (Y.C.) Hsieh, et al., "*Athermal Demodulator for 42.7-Gb/s DPSK Signals*", www.optoplex.com/pdf/ecoc05_a_odi_final.pdf, 2 pages, 2005.

C. R. Doerr, et al., PDP12, "*Simultaneous reception of both quadratures of 40-Gb/s DQPSK using a simple monolithic demodulator*", © 2005 Optical Society of America, 3 pages, 2005.

* cited by examiner

*Primary Examiner*—Hanh Phan
(74) *Attorney, Agent, or Firm*—Baker Botts L.L.P.

(57) ABSTRACT

A demodulator includes one or more modules operable to receive an input signal comprising symbols. A module receives a main signal comprising at least a portion of the input signal and splits the main signal to yield a branching signal and a remaining main signal. The branching signal travels along a first path, and the remaining main signal travels along a second path. The second path introduces a delay with respect to the first path. If there is a next module, the module sends a first portion of the remaining main signal to a next module as a main signal for the next module. The module combines the branching signal and at least a second portion of the remaining main signal to generate interference. The interference indicates a phase shift between a phase corresponding to a symbol and a successive phase corresponding to a successive symbol.

24 Claims, 2 Drawing Sheets

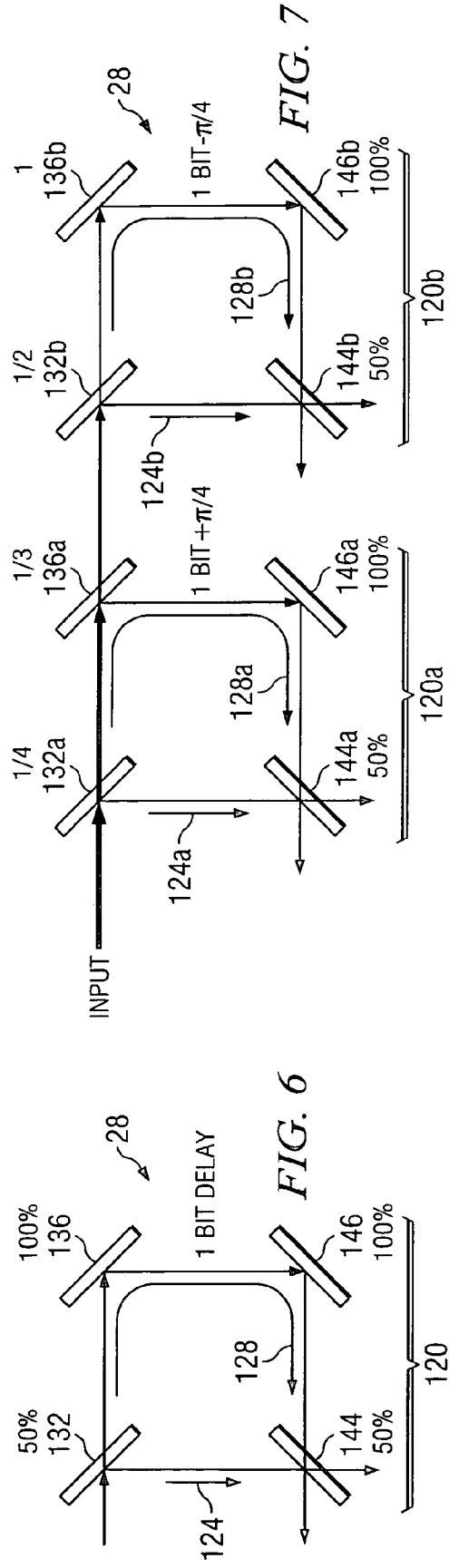
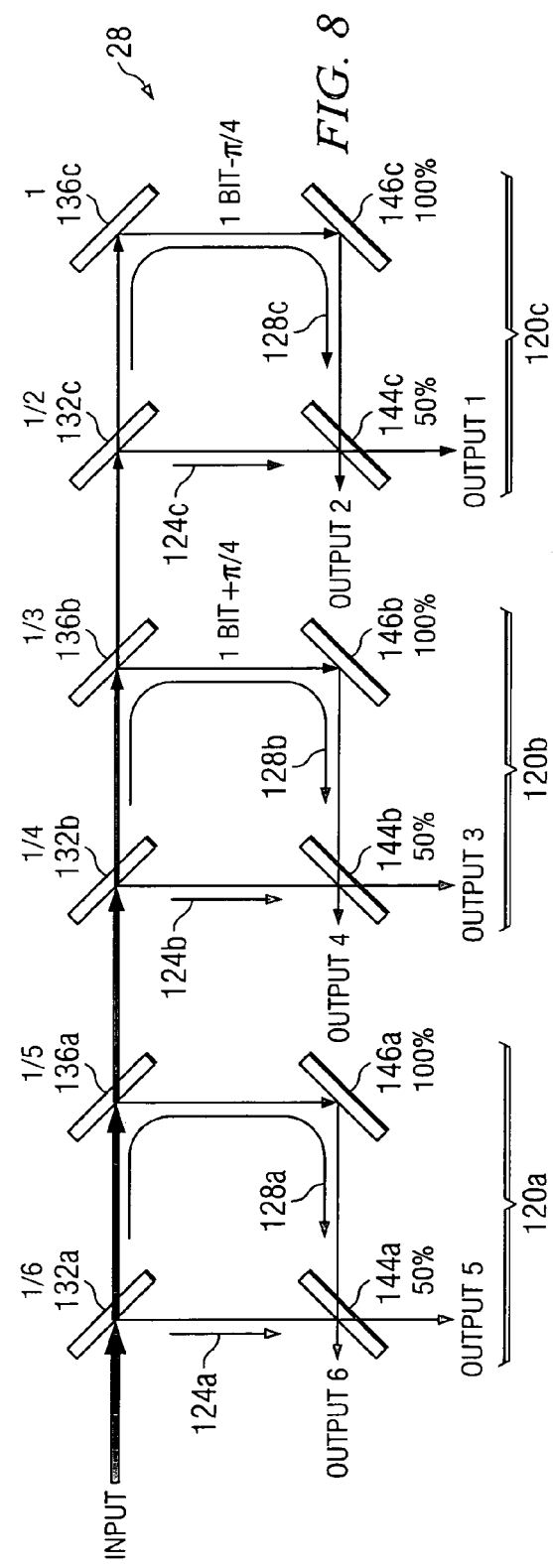

US 7,650,083 B2

DEMODULATING A SIGNAL BY PERFORMING CONSECUTIVE BEAM SPLITTING

TECHNICAL FIELD

This invention relates generally to the field of signal communication and more specifically to demodulating a signal by performing consecutive beam splitting.

BACKGROUND

Signals may be modulated according to a differential phase-shifted keying (DPSK) digital modulation technique. According to the technique, changes in phase are used to represent bit data. A modulator at a transmitter translates an input bit sequence into phase changes that represent the input bit sequence. A demodulator at a receiver translates the phase changes to retrieve the input bit sequence.

Known techniques for demodulating a signal, however, are not satisfactory in certain situations. Accordingly, these known techniques are not satisfactory in certain situations.

SUMMARY OF THE DISCLOSURE

In accordance with the present invention, disadvantages and problems associated with previous techniques for demodulating differential phase-shifted keying signals may be reduced or eliminated.

According to one embodiment of the present invention, a demodulator includes one or more modules operable to receive an input signal comprising symbols. A module receives a main signal comprising at least a portion of the input signal and splits the main signal to yield a branching signal and a remaining main signal. The branching signal travels along a first path, and the remaining main signal travels along a second path. The second path introduces a delay with respect to the first path. If there is a next module, the module sends a first portion of the remaining main signal to a next module as a main signal for the next module. The module combines the branching signal and at least a second portion of the remaining main signal to generate interference. The interference indicates a phase shift between a phase corresponding to a symbol and a successive phase corresponding to a successive symbol.

Certain embodiments of the invention may provide one or more technical advantages. A technical advantage of one embodiment may be that a demodulator may demodulate a signal using consecutive modules. A module may split a signal into a branching signal that travels along one path and a main signal that travels along another path. The main signal may be delayed by a symbol delay to allow for overlapping of consecutive symbols when the branching and main signals are combined.

Another technical advantage of one embodiment may be that the modules may be implemented as free space modules. Another technical advantage of one embodiment may be that the modules may be implemented as bulk optics modules. Another technical advantage of one embodiment may be that the modules may be implemented as waveguide modules.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 6 is a diagram illustrating one embodiment of a demodulator for DPSK demodulation;

FIG. 7 is a diagram illustrating one embodiment of a demodulator for 4-PSK demodulation; and FIG. 8 is a diagram illustrating one embodiment of a demodulator for 8-PSK demodulation.

DETAILED DESCRIPTION OF THE DRAWINGS

Embodiments of the present invention and its advantages are best understood by referring to FIGS. 1 through 8 of the drawings, like numerals being used for like and corresponding parts of the various drawings.

Figure 1:
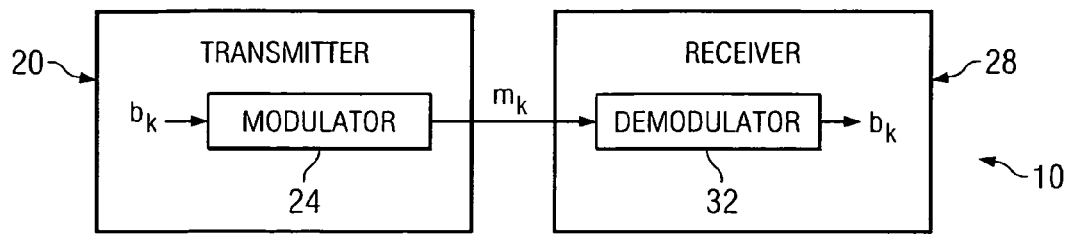
FIG. 1 is a block diagram illustrating one embodiment of a system for communicating a signal according to a differential phase-shifted keying (DPSK) modulation technique.

FIG. 1 is a block diagram illustrating one embodiment of a system 10 for communicating a signal according to a differential phase-shifted keying (DPSK) modulation technique. According to the embodiment, system 10 includes a demodulator operable to demodulate a signal by performing consecutive beam splitting.

According to the embodiment, system 10 communicates signals. A signal may refer to an optical signal transmitted as light pulses comprising photons. An optical signal may have a frequency of approximately 1550 nanometers, and a data rate of, for example, 10, 20, 40, or over 40 gigabits per second. A signal may communicate information in packets. A packet may comprise a bundle of data organized in a specific way for transmission. A packet may carry any suitable information such as voice, data, audio, video, multimedia, other information, or any combination of the preceding.

System 10 includes components that include any suitable arrangement of elements operable to perform the operations of the component, and may comprise logic, an interface, a memory, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes a transmitter 20 operable to communicate a signal to a receiver 28. Transmitter 20 includes a modulator 24 that encodes the signal according to DPSK modulation. Receiver 28 includes a demodulator 28 that decodes the encoded signal.

According to the embodiment, modulator 24 receives a signal with input bits $b_k$ for time slots k. Modulator 24 encodes bits $b_k$ to yield modulated signal $m_k$. Modulator 24 may comprise any suitable modulator, for example, a Mach-Zehner modulator. Modulator 24 may have a laser that emits a continuous wave light beam, and may modulate the light beam to encodes bits $b_k$.

Bits $b_k$ may be encoded according to DPSK modulation where phase shifts between successive symbols represent bits $b_k$. According to n-phase-shifted keying (n-PSK) modulation, n different levels of phase shifts may be used to encode p bits per symbol, where $n=2^p$. As an example, according to 4-PSK, or differential quadrature phase-shifted keying (DQPSK), four phase differences are used to encode two bits per symbol. In one case, phase shifts 0°, 90°, 180°, and −90° may be used to encode "00", "01", "11", and "10", respectively. As another example, according to 8-PSK, eight phase differences are used to encode three bits per symbol.

Transmitter 20 transmits modulated signal $m_k$ to receiver 28. Demodulator 28 of transmitter 20 demodulates signal $m_k$ to reverse the encoding procedure to yield bits $b_k$. To demodulate signal $m_k$, demodulator 28 compares the phase shifts between successive symbols. Demodulator 28 may split signal $m_k$ to yield multiple signals. A signal of the multiple signals may be delayed by one symbol to yield a delayed signal. The delayed signal and a non-delayed signal may be overlapped to compare the phases of successive symbols. The phases may be compared by constructively and destructively interfering the overlapped signals. Demodulator 28 may include photodiodes that detect the interference and generate a detector signal representing the interference.

According to one embodiment, demodulator 28 is operable to demodulate a signal by performing consecutive beam splitting. Demodulator 28 may include consecutive modules. A module may split a signal into a branching signal that travels along a path and a main signal that travels along another path. The main signal may be delayed by a symbol delay to allow for overlapping of consecutive symbols when the branching and main signals are combined. An embodiment of demodulator is described with reference to FIG. 2.

Modifications, additions, or omissions may be made to system 10 without departing from the scope of the invention. The components of system 10 may be integrated or separated according to particular needs. Moreover, the operations of system 10 may be performed by more, fewer, or other devices. Additionally, operations of system 10 may be performed using any suitable logic. As used in this document, "each" refers to each member of a set or each member of a subset of a set.

Figure 2:
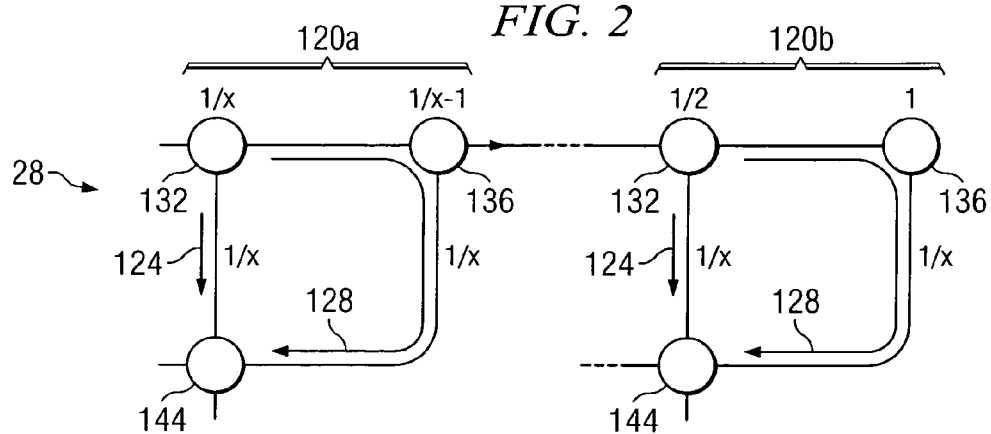
FIG. 2 is a diagram illustrating one embodiment of a demodulator operable to demodulate a signal by performing consecutive beam splitting that may be used with the system of FIG. 1.

FIG. 2 is a diagram illustrating one embodiment of a demodulator 28 operable to demodulate a signal by performing consecutive beam splitting. Demodulator 28 may be used with system 10 of FIG. 1.

Demodulator 28 includes one or more consecutive modules 120. The number of modules 120 may be established in accordance with the phase-shifted keying modulation of the signal. According to one embodiment, p modules 120 may be used for n-PSK modulation, where $n=2^p$. For example, one module 120 may be used for 2-PSK modulation, two modules 120 may be used for 4-PSK modulation, and three modules 120 may be used for 8-PSK modulation. The last module 120 of a sequence of modules 120 may be referred to as a terminating module.

According to one embodiment, a module 120 may split a signal into a branching signal that travels along path 124 and a main signal that travels along path 128. The main signal of path 128 may be delayed by a symbol delay to allow for overlapping of consecutive symbols when the branching and main signals are combined.

A module 120 includes optical operators. An optical operator operates to split or reflect an optical signal. As an example, an optical operator may comprise an optical device such as a beam splitter or a reflector. As another example, an optical operator may comprise a bulk optic. As yet another example, an optical operator may comprise a wave guide.

According to the illustrated embodiment, a module 120 includes optical operators 132, 136, and 144. Optical operator 132 splits a signal into a branching signal and a main signal. Optical operator 136 directs at least a portion of the main signal along path 128. If a module 120 is not a terminating module, optical operator 136 may comprise a beam splitter that directs a portion of the main signal towards the next module 120. If a module 120 is a terminating module, optical operator 136 may comprise a reflector that directs substantially all of the main signal along path 128.

Optical operator 144 combines the signals from paths 124 and 128 to compare the phases corresponding to successive symbols. Photodiodes may detect constructive and destructive interference of the combined signals to compare the phases.

According to the illustrated embodiment, the optical operators may be selected such that the signals that are combined at optical operators 144 are substantially the same proportion of the input signal. That is, the signals combined at optical operators 144 are each 1/x of the signal input into demodulator 28. According to one embodiment, x=2p, where $n=2^p$. For example x=2 for 2-PSK, x=4 for 4-PSK, and x=6 for 8-PSK.

Modifications, additions, or omissions may be made to demodulator 28 without departing from the scope of the invention. The components of demodulator 28 may be integrated or separated according to particular needs. Moreover, the operations of demodulator 28 may be performed by more, fewer, or other devices.

Moreover, modifications, additions, or omissions may be made to module 120 without departing from the scope of the invention. The components of module 120 may be integrated or separated according to particular needs. Moreover, the operations of module 120 may be performed by more, fewer, or other devices.

Figure 3:
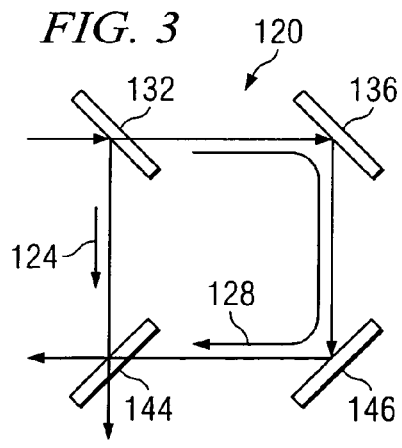
FIG. 3 is a diagram illustrating one embodiment of a free space module that may be used with the demodulator of FIG. 2 to demodulate a signal in free space.

FIG. 3 is a diagram illustrating one embodiment of a free space module 120 that may be used with demodulator 28 of FIG. 2 to demodulate a signal in free space. Free space may refer to a space where there is no solid material, for example, there is a vacuum, a gas, or a liquid, other non-solid, or any combination of any of the preceding. Accordingly, a signal may be communicated through a vacuum, a gas, or a liquid.

According to the illustrated embodiment, module 120 includes optical operators 132, 136, 144, and 146. According to the embodiment, optical operator 132 may comprise a beam splitter operable to split a signal to yield signals that travel along paths 124 and 128. Optical operator 136 may comprise a beam splitter if module 120 is not a terminating module, or may comprise a reflector operable to direct a signal along path 128 if module 120 is a terminating module. Optical operator 146 may comprise a reflector operable to direct a signal along path 128. Optical operator 144 may comprise an optical coupler operable to compare signals from paths 124 and 128. At least a portion of path 124, path 128, or both paths 124 and 128 may be in free space.

Figure 4:
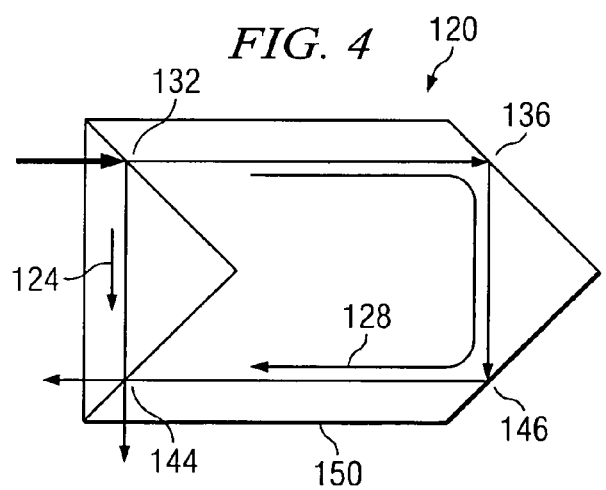
FIG. 4 is a diagram illustrating one embodiment of a bulk optic module that may be used with the demodulator of FIG. 2.

FIG. 4 is a diagram illustrating one embodiment of a bulk optic module 120 that may be used with demodulator 28 of FIG. 2. Module 120 comprises bulk optics 150. Bulk optics 150 may comprise any material suitable for splitting or reflecting or splitting and reflecting an optical signal, for example, fused silica.

Bulk optics 150 includes optical operators 132, 136, 144, and 146. Optical operator 132 may comprise a filter operable to split a signal to yield signals that travel along paths 124 and 128. Optical operator 136 may comprise a filter operable to split a signal if module 120 is not a terminating module, or may comprise a lens operable to direct a signal along path 128 if module 120 is a terminating module. Optical operator 146 may comprise a lens operable to direct a signal along path 128. Optical operator 144 may comprise a filter operable to couple signals from paths 124 and 128. The lengths of paths 124 and 128 may be controlled by adjusting the temperature of bulk optics 150.

Figure 5:
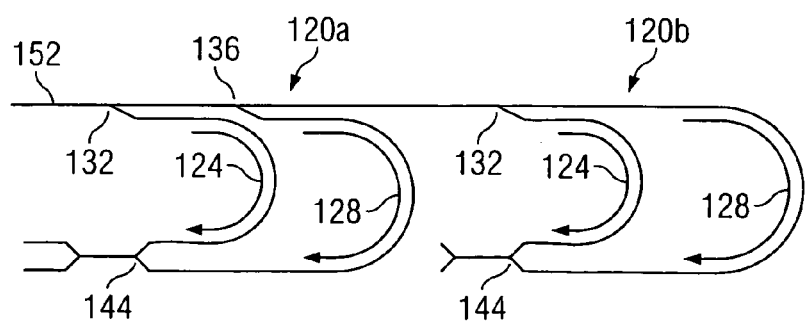
FIG. 5 is a diagram illustrating a waveguide module that may be used with the demodulator of FIG. 2.

FIG. 5 is a diagram illustrating a waveguide module 120 that may be used with demodulator 28 of FIG. 2. According to the illustrated embodiment, module 120 comprises waveguides 152 such as optical fibers. Module 120 includes optical operators 132, 136, and 144. Optical operator 132 may comprise a branching waveguide operable to split a signal to yield signals that travel along paths 124 and 128. Optical operator 136 may comprise a branching waveguide if module 120 is not a terminating module, or may comprise a waveguide operable to direct a signal along path 128 if module 120 is a terminating module. Optical operator 144 may comprise a coupling of wave guides 152 operable to couple signals from paths 124 and 128.

FIG. 6 is a diagram illustrating one embodiment of a demodulator 28 for DPSK demodulation. Although the embodiment is illustrated using a free space module 120 of FIG. 3, any suitable module 120 may be used. According to the embodiment, demodulator 28 includes a module 120. Module 120 includes optical operators 132, 136, 146, and 144. Optical operator 132 may be selected to yield equivalent branching signals. According to one embodiment, optical operator 132 may split an input signal into equivalent signals comprising a branching signal that travels along path 124 and a main signal that travels along path 128.

FIG. 7 is a diagram illustrating one embodiment of a demodulator 28 for 4-PSK demodulation. Although the embodiment is illustrated using a free space module 120 of FIG. 3, any suitable module 120 may be used. According to the illustrated embodiment, demodulator 28 includes modules 120a and 120b. Module 120a includes optical features 132a and 136a, and module 120b includes optical operators 132b and 136b. Optical features 132a, 136a, 132b, and 136b may be selected to yield equivalent branching signals.

Optical operator 132a splits an output signal to yield a first branching signal comprising ¼ of the input signal and a main signal comprising ¾ of the input signal. Optical operator 136a splits the main signal into a second branching signal comprising ⅓ of the main signal (¼ of the input signal) and a remaining main signal that comprises ⅔ of the main signal (½ of the input signal).

Optical operator 132b splits the remaining main signal into a third branching signal comprising ½ of the main signal (¼ of the input signal) and a remaining main signal that comprises ½ of the main signal (¼ of the input signal). Optical operator 136b may comprise a reflector that reflects substantially all of the remaining main signal to yield a fourth branching signal (¼ of the input signal). According to the embodiment, each branching signal comprises ¼ of the input signal.

FIG. 8 is a diagram illustrating one embodiment of a demodulator 28 for 8-PSK demodulation. Although the embodiment is illustrated using a free space module 120 of FIG. 3, any suitable module 120 may be used. According to the illustrated embodiment, demodulator 28 includes modules 120a, 120b, and 120c. Module 120a includes optical features 132a and 136a, module 120b includes optical operators 132b and 136b, and module 120c includes optical operators 132c and 136c. Optical features 132a, 136a, 132b, 136b, 132c, and 136c may be selected to yield equivalent branching signals.

Optical operator 132a splits an input signal to yield a first branching signal comprising ⅙ of the input signal and a main signal comprising ⅚ of the input signal. Optical operator 136a splits the main signal into a second branching signal comprising ⅕ of the main signal (⅙ of the input signal) and a remaining main signal that comprises ⅘ of the main signal (⅔ of the input signal).

Optical operator 132b splits the main signal into a third branching signal comprising ¼ of the main signal (⅙ of the input signal) and a remaining main signal that comprises ¾ of the main signal (½ of the input signal). Optical operator 136b splits the main signal into a fourth branching signal comprising ⅓ of the main signal (⅙ of the input signal) and a remaining main signal that comprises ⅔ of the main signal (⅓ of the input signal).

Optical operator 132c splits the main signal into a fifth branching signal comprising ½ of the main signal (⅙ of the input signal) and a remaining main signal that comprises ¼ of the main signal (⅙ of the input signal). Optical operator 136b may comprise a reflector that reflects substantially all of the remaining main signal to yield a sixth branching signal ⅙ of the input signal). According to the embodiment, each branching signal comprises ⅙ of the input signal.

Certain embodiments of the invention may provide one or more technical advantages. A technical advantage of one embodiment may be that a demodulator may demodulate a signal using consecutive modules. A module may split a signal into a branching signal that travels along one path and a main signal that travels along another path. The main signal may be delayed by a symbol delay to allow for overlapping of consecutive symbols when the branching and main signals are combined.

Another technical advantage of one embodiment may be that the modules may be implemented as free space modules. Another technical advantage of one embodiment may be that the modules may be implemented as bulk optics modules. Another technical advantage of one embodiment may be that the modules may be implemented as waveguide modules.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A demodulator operable to demodulate a signal, comprising:
   two or more modules in a series arrangement operable to receive an input signal, the input signal comprising a plurality of symbols, a module of the two or more modules operable to:

receive a main signal comprising at least a portion of the input signal;

split the main signal to yield a branching signal and a remaining main signal, the branching signal traveling along a first path, the remaining main signal traveling along a second path, the second path introducing a delay with respect to the first path;

send a first portion of the remaining main signal to a next module as a main signal for the next module, if there is a next module; and combine the branching signal and at least a second portion of the remaining main signal to generate interference, the interference indicating a phase shift between a phase corresponding to a symbol of the plurality of symbols and a successive phase corresponding to a successive symbol of the plurality of symbols.

2. The demodulator of claim 1, wherein a module of the two or more modules further comprises:

a first optical operator operable to split the main signal to yield the branching signal and the remaining main signal;

a second optical operator operable to:
split the remaining main signal to yield the first portion of the remaining main signal and the second portion of the remaining main signal; and
send the first portion of the remaining main signal to the next module; and a third optical operator operable to combine the branching signal and the second portion of the remaining main signal.

3. The demodulator of claim 2, wherein:
the first optical operator comprises a first beam splitter;
the second optical operator comprises a second beam splitter; and
the third optical operator comprises an optical coupler.

4. The demodulator of claim 2, wherein:
the first optical operator comprises a first filter;
the second optical operator comprises a second filter; and
the third optical operator comprises a third filter.

5. The demodulator of claim 2, wherein:
the first optical operator comprises a first branching waveguide;
the second optical operator comprises a second branching waveguide; and
the third optical operator comprises a coupling waveguide.

6. The demodulator of claim 1, wherein the two or more modules further comprises a terminating module, the terminating module comprising:
a first terminating optical operator operable to split the main signal to yield the branching signal and the remaining main signal; and
a second terminating optical operator operable to combine the branching signal and the at least the second portion of the remaining main signal.

7. The demodulator of claim 6, wherein:
the first terminating optical operator comprises a terminating beam splitter; and
the second terminating optical operator comprises a terminating optical coupler.

8. The demodulator of claim 6, wherein:
the first terminating optical operator comprises a first terminating filter; and
the second terminating optical operator comprises a second terminating filter.

9. The demodulator of claim 6, wherein:
the first terminating optical operator comprises a terminating branching waveguide; and
the second terminating optical operator comprises a terminating coupling waveguide.

10. The demodulator of claim 1, wherein the two or more branching signals and the two or more the second portions of the remaining main signal each comprise an equivalent portion of the input signal.

11. The demodulator of claim 1, wherein:
the input signal is modulated according to $2^p$-phase-shifted keying modulation; and
the two or more modules comprises p modules.

12. A method for demodulating a signal, comprising:
receiving an input signal at two or more modules in a series arrangement, the input signal comprising a plurality of symbols; and
performing the following for each module of the two or more modules:
receiving a main signal comprising at least a portion of the input signal;
splitting the main signal to yield a branching signal and a remaining main signal, the branching signal traveling along a first path, the remaining main signal traveling along a second path, the second path introducing a delay with respect to the first path;
sending a first portion of the remaining main signal to a next module as a main signal for the next module, if there is a next module; and
combining the branching signal and at least a second portion of the remaining main signal to generate interference, the interference indicating a phase shift between a phase corresponding to a symbol of the plurality of symbols and a successive phase corresponding to a successive symbol of the plurality of symbols.

13. The method of claim 12, wherein:
splitting the main signal to yield the branching signal and the remaining main signal further comprises:
splitting the main signal at a first optical operator;
splitting the remaining main signal to yield the first portion of the remaining main signal and the second portion of the remaining main signal further comprises:
splitting the remaining main signal at a second optical operator:
sending the first portion of the remaining main signal to the next module further comprises:
sending the first portion from the second optical operator; and
combining the branching signal and the second portion of the remaining main signal further comprises:
combining the branching signal and the second portion of the remaining main signal at a third optical operator.

14. The method of claim 13, wherein:
the first optical operator comprises a first beam splitter;
the second optical operator comprises a second beam splitter; and
the third optical operator comprises an optical coupler.

15. The method of claim 13, wherein:
the first optical operator comprises a first filter;
the second optical operator comprises a second filter; and
the third optical operator comprises a third filter.

16. The method of claim 13, wherein:
the first optical operator comprises a first branching waveguide;
the second optical operator comprises a second branching waveguide; and
the third optical operator comprises a coupling waveguide.

17. The method of claim 12, wherein:
splitting the main signal to yield the branching signal and the remaining main signal further comprises:
splitting the main signal at a first terminating optical operator; and
combining the branching signal and the at least the second portion of the remaining main signal further comprises:
combining the branching signal and the at least the second portion of the remaining main signal at a second terminating optical operator.

18. The method of claim 17, wherein:
the first terminating optical operator comprises a terminating beam splitter; and
the second terminating optical operator comprises a terminating optical coupler.

19. The method of claim 17, wherein:
the first terminating optical operator comprises a first terminating filter; and
the second terminating optical operator comprises a second terminating filter.

20. The method of claim 17, wherein:
the first terminating optical operator comprises a terminating branching waveguide; and
the second terminating optical operator comprises a terminating coupling waveguide.

21. The method of claim 12, wherein the two or more branching signals and the two or more the second portions of the remaining main signal each comprise an equivalent portion of the input signal.

22. The method of claim 12, wherein:
the input signal is modulated according to $2^p$-phase-shifted keying modulation; and
the two or more modules comprises p modules.

23. A system for demodulating a signal, comprising:
means for receiving an input signal at two or more modules in a series arrangement, the input signal comprising a plurality of symbols; and
means for performing the following for each module of the two or more modules:
receiving a main signal comprising at least a portion of the input signal;
splitting the main signal to yield a branching signal and a remaining main signal, the branching signal traveling along a first path, the remaining main signal traveling along a second path, the second path introducing a delay with respect to the first path;
sending a first portion of the remaining main signal to a next module as a main signal for the next module, if there is a next module; and
combining the branching signal and at least a second portion of the remaining main signal to generate interference, the interference indicating a phase shift between a phase corresponding to a symbol of the plurality of symbols and a successive phase corresponding to a successive symbol of the plurality of symbols.

24. A demodulator operable to demodulate a signal, comprising:
two or more modules in a series arrangement operable to receive an input signal, the input signal comprising a plurality of symbols, the input signal modulated according to $2^p$-phase-shifted keying modulation, the two or more modules comprises p modules, a module of the two or more modules operable to:
receive a main signal comprising at least a portion of the input signal;
split the main signal to yield a branching signal and a remaining main signal, the branching signal traveling along a first path, the remaining main signal traveling along a second path, the second path introducing a delay with respect to the first path;
send a first portion of the remaining main signal to a next module as a main signal for the next module, if there is a next module; and
combine the branching signal and at least a second portion of the remaining main signal to generate interference, the interference indicating a phase shift between a phase corresponding to a symbol of the plurality of symbols and a successive phase corresponding to a successive symbol of the plurality of symbols, wherein:
a module of the two or more modules further comprises:
a first optical operator operable to split the main signal to yield the branching signal and the remaining main signal;
a second optical operator operable to:
split the remaining main signal to yield the first portion of the remaining main signal and the second portion of the remaining main signal; and
send the first portion of the remaining main signal to the next module; and
a third optical operator operable to combine the branching signal and the second portion of the remaining main signal; and
the two or more modules further comprises a terminating module, the terminating module comprising:
a first terminating optical operator operable to split the main signal to yield the branching signal and the remaining main signal; and
a second terminating optical operator operable to combine the branching signal and the at least the second portion of the remaining main signal;
the first optical operator comprises at least one of:
a first beam splitter;
a first filter; and
a first branching waveguide;
the second optical operator comprises at least one of:
a second beam splitter;
a second filter; and
a second branching waveguide; and
the third optical operator comprises at least one of:
an optical coupler;
a third filter; and
a coupling waveguide;
the first terminating optical operator comprises at least one of:
a terminating beam splitter;
a first terminating filter; and
a terminating branching waveguide; and
the second terminating optical operator comprises at least one of:
a terminating optical coupler;
a second terminating filter; and
a terminating coupling waveguide, the two or more branching signals and the two or more the second portions of the remaining main signal each comprising an equivalent portion of the input signal.

* * * * *